United States Patent [19]
Jenkins

[11] Patent Number: 5,104,361
[45] Date of Patent: Apr. 14, 1992

[54] APPARATUS AND METHOD FOR ADJUSTING THE TRACTIVE TORQUE OUTPUT OF A FRICTIONAL DIFFERENTIAL

[76] Inventor: Jimmy R. Jenkins, 1814 Mayfield Ave., Garland, Tex. 75042

[21] Appl. No.: 488,971

[22] Filed: Mar. 5, 1990

[51] Int. Cl.⁵ .......................... F16H 1/38; F16H 13/10
[52] U.S. Cl. ..................... 475/184; 475/264; 475/249
[58] Field of Search ............... 475/184, 196, 220, 222, 475/223, 234, 235, 243, 248, 249, 264; 74/212, 395, 396; 446/465, 448

[56] References Cited

U.S. PATENT DOCUMENTS

| | | | |
|---|---|---|---|
| 2,818,712 | 1/1958 | Barnes et al. | 475/264 X |
| 3,227,003 | 1/1966 | Thompson | 475/184 |
| 3,474,689 | 10/1969 | Young | 475/235 |
| 4,635,505 | 1/1987 | Williamson | 475/184 |

FOREIGN PATENT DOCUMENTS

| | | | |
|---|---|---|---|
| 0671445 | 10/1963 | Canada | 475/184 |
| 0341205 | 1/1931 | United Kingdom | 475/184 |
| 2034423 | 6/1980 | United Kingdom | 475/184 |

OTHER PUBLICATIONS

FIG. 4 of patent application Ser. No. 488,971, admitted as prior art by applicant (filed Mar. 5, 1990).

*Primary Examiner*—Allan D. Herrmann
*Assistant Examiner*—Khoi Q. Ta

[57] ABSTRACT

This invention provides an improved apparatus and an improved method of adjusting the tractive torque at the driven wheels of a scale model vehicle employing an enclosed friction driven differential. The invention's improvements allow this adjustment to be accomplished without disassembly of the driven axles, or removing any member of the differential's enclosure to gain access to the internal adjusting components.

14 Claims, 4 Drawing Sheets

APPARATUS AND METHOD FOR ADJUSTING THE TRACTIVE TORQUE OUTPUT OF A FRICTIONAL DIFFERENTIAL

BACKGROUND OF THE INVENTION

1. Field of Use

This invention will be used in the scale model vehicle industry, and more particularly to remote controlled racing vehicles where there is the requirement for regular adjustment of its differential's output torque. The need for a simple, rapid, and reliable means for making the adjustment has existed for sometime in this industry. Prior attempts have as yet failed to meet this need. Most have required dismantling of one drive line or the differential enclosure. The instant invention not only meets this need, it provides an economy of vehicle operation by eliminating cost of replacing damaged drive lines incurred when removing them to make an adjustment.

2. Prior Art

Known prior art in this industry is illustrated in FIGS. 4 and 5 of the drawings. The prior art does not reveal the specific apparatus and method of the instant invention, and such prior devices require disassembly of driven shafts or the removal of enclosures to make the required adjustments.

SUMMARY OF THE INVENTION

A principal object of this invention is to provide an apparatus for adjusting the compressive force applied to the frictional driving members of a driving differential, thereby changing the tractive torque at the driven wheels of a remote controlled scale model vehicle without requiring disassembly of a driven axle, or any dismantling of the enclosure that houses the friction driving differential.

Another object is to provide a locking apparatus, such as a locking pin, that prevents rotation of at least one driven wheel but permits rotation of the opposite driven wheel.

Still another object presents a guidance means, installed into the differential's enclosure, which provides directional control of a locking apparatus within the differential's enclosure.

An additional object is to supply an apparatus for varying the compressive force applied by the differential's opposed friction drive plates to the adjacent friction members encased within the configured plastic web of the drive gear.

DESCRIPTION OF THE PREFERRED EMBODIMENT

Figure 1:
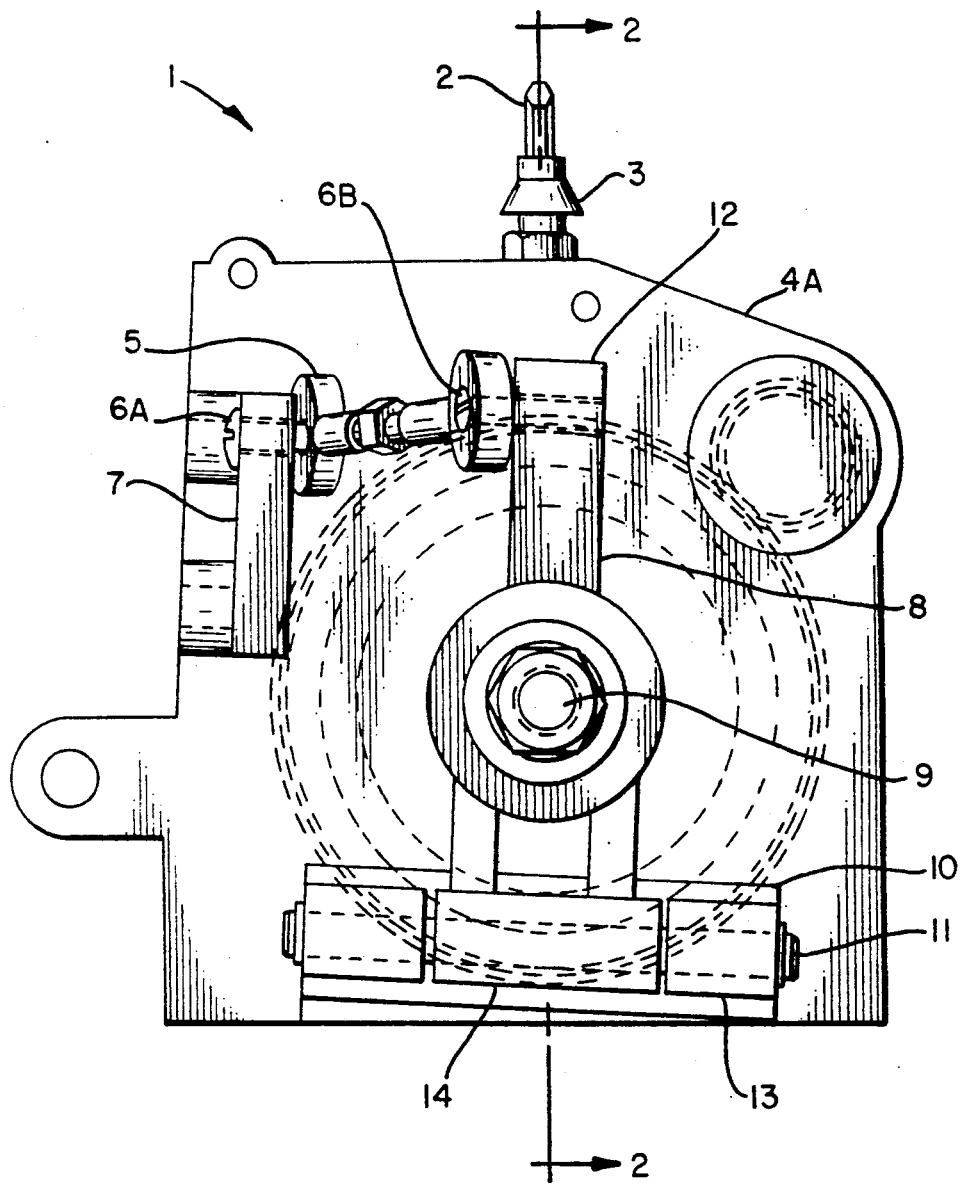
FIG. 1 is outside side view of the differential taken from one axial end.

In FIG. 1 the instant invention 1, an apparatus for adjusting the output torque of a differential used in model racing cars is shown. Locking pin 2, which may be a small hexagon wrench made with a sufficiently long shank and a shorter, insertion limiting shank 2A perpendicular to the long shank, is inserted into the differential through guide means adapter 3. Guide means adapter 3 is securely assembled to the plastic differential housing half 4A such that the locking pin 2 may clearly pass through the internal members of the differential as better seen in FIGS. 2 and 3. Locking pin 2 prevents a first driven spindle 9 from rotation. FIG. 1 further illustrates the relationship of the basic external support members of the power transmission line to a first driven spindle 9 supported by bearings within spindle housing 8. Spindle housing 8 is pivotally attached to stationary flange 7 with link 5. Link 5 is fastened to stationary flange 7, and the upper knuckle 12 of spindle housing 8 with pivot pins 6A and 6B, providing lateral stability for the driven spindle 9 as spindle housing 8 pivots about pivot pin 11. Spindle housing 8 is attached to A-frame 10 with pivot pin 11 which passes through the fixed outside trunnions 13 on A-frame 10 -and the fixed inside lower knuckle 14 on spindle housing 8, all as shown in FIG. 1.

Figure 2:
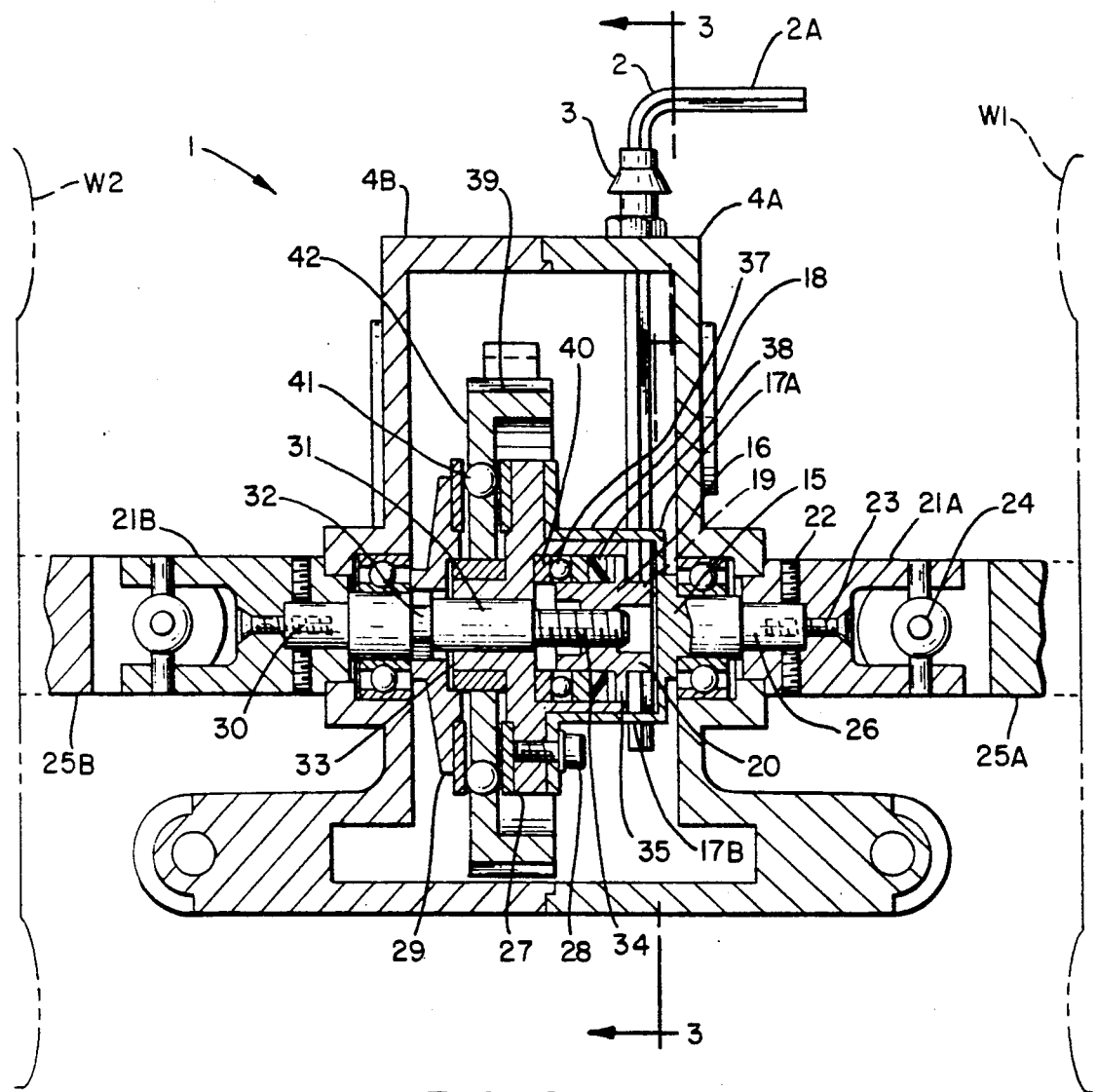
FIG. 2 is a section view of the differential taken along line 2—2 of FIG. 1.
Figure 2A:
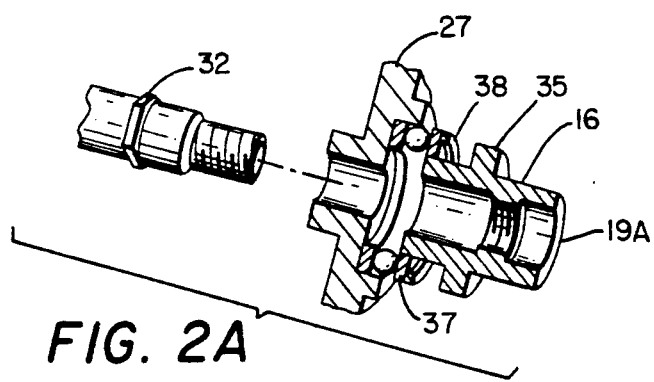
FIG. 2A is a partial pictorial view to clarify certain component relationships shown in FIG. 2.

The improved apparatus for adjusting the output torque transmitted by a friction driven differential to at the driven wheels W1 and W2 is best seen in FIGS. 2 and 2A. Locking pin 2 is shown passing through guide means adapter 3; through a second guide means comprising coincident transverse holes 17A and 17B provided in the circular housing 18 which is an integral part of first stub axle 15; and is positioned adjacent either one of the flat parallel surfaces 19A or 19B of shank 20 of locking adjusting nut 16, thereby preventing rotation of the first stub axle 15, and locking adjusting nut 16. Further shown in FIG. 2, universal yoke 21A is secured to a first stub axle 15 using a flat head machine screw 23 threaded into the yoke shank 26 formed on the first stub axle 15. Universal yoke 21A is prevented from spinning around the yoke shank 26 by the clamping force exerted by the cup point set screws 22. A first driven wheel W1 is attached to first driven spindle 9 that is pivotally attached to a first driven axle 25A. The first driven axle 25A is subsequently attached to universal yoke 21A using universal cross 24. The first stub axle 15 is fastened to a first friction driven plate 27 using a plurality of socket head machine screws 28 thereby completing the first drive line to the first driven wheel W1. A second friction driven plate 29 is supported on driving journal 32 provided on a second stub axle 30 with its journal 31 fitting inside bearing bore 33 in the first friction driven plate 27, thereby causing friction driven plates 27 and 29 to be in concentric alignment with locking adjusting nut 16, compression spring 38, thrust bearing 37, drive gear 39, and the first stub axle 15. Threaded shaft 34, on the second stub axle 30, engages the internal threads in the adjusting nut 16 shown in a fixed position. A second driven wheel W2 is similarly attached to a second driven axle 25B as the first driven wheel W1 is attached to the first driven axle 25A. Second driven axle is further attached to a second universal yoke 21B in the same manner as the first driven axle 25A is attached to the first universal yoke 21A. Second universal yoke 21B is attached to a second stub axle 30 in the same way universal yoke 21A is attached to the first stub axle 15. Rotation of the second driven wheel W2 in either direction, cw or ccw, causes the adjusting nut 16 to move axially along threaded shaft 34 allowing shoulder 35 on adjusting nut 16 to compress spring 38 against thrust bearing 37 which is seated in bore 40 of the first friction driven plate 27. This compressive force is transferred to friction driven plates 27 and 29 bearing against a plurality of rolling balls 41 encased within the web 42 of the drive gear 39, causing the differential's adjusted torque provided by the rotating drive gear 39 to be transmitted to driven wheels W1 an W2.

Figure 3:
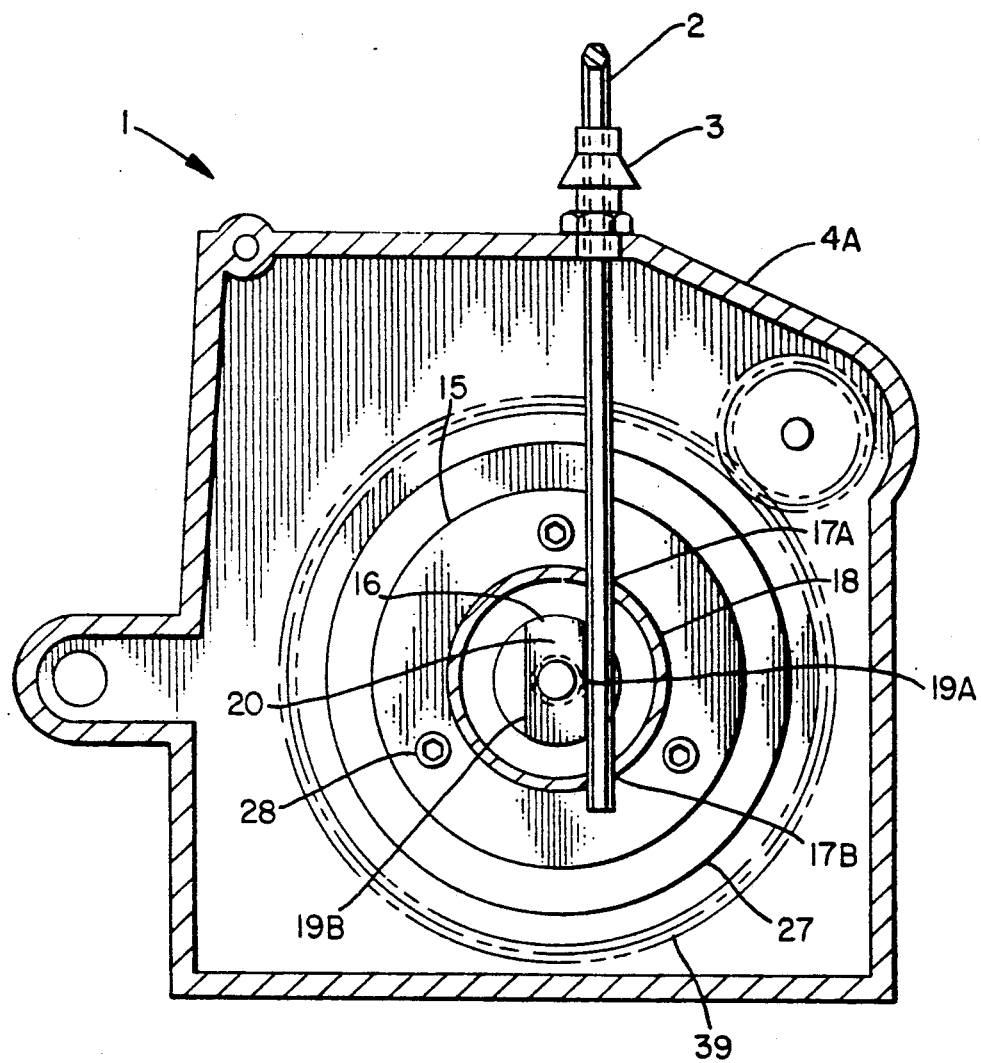
FIG. 3 is a section view taken along line 3—3 of FIG. 2.

The embodiment that provides the means for adjusting the friction driven differential's output torque by holding the adjusting nut 16 in a fixed position, and locking one driven wheel W1 while the second wheel W2 is left free to rotate is shown in FIG. 3. Locking pin 2 is shown passing through the guide adapter 3, transverse holes 17A, 17B, and the shank of locking pin 2 is adjacent either of the flat parallel surfaces of 19A or 19B on the shank 20 of locking adjusting nut 16. Further shown is the first driven stub axle 15 attached to the first friction driven plate 27 with socket head fasteners 28. Since the transverse holes 17A and 17B in the circular housing 18 are an integral feature of the stub axle 15, and receive the shank of locking pin 2, no relative motion can occur between housing 4A, stub axle 15, and locking adjusting nut 16. The first stub axle 15 is thus prevented from rotating because locking pin 2 is held in a fixed position by guide means adapter 3. Locking adjusting nut 16 is also restrained from rotating because locking pin 2 is positioned adjacent transverse surface 19A or 19B by means of the location of transverse holes 17A and 17B. Due to the described emplacements, rotary motion of drive gear 39 cannot be transmitted to the driven wheels W1 and W2 when the locking pin 2 is positioned as shown in FIGS. 2 and 3.

Figure 4:
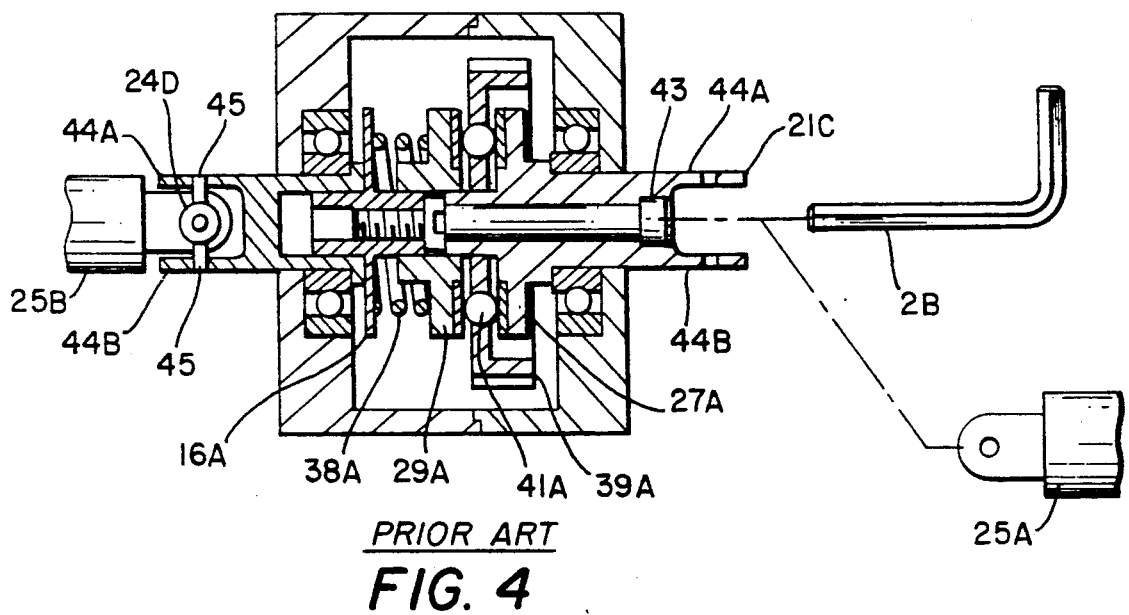
FIG. 4 is a view of one known prior art device.
Figure 5:
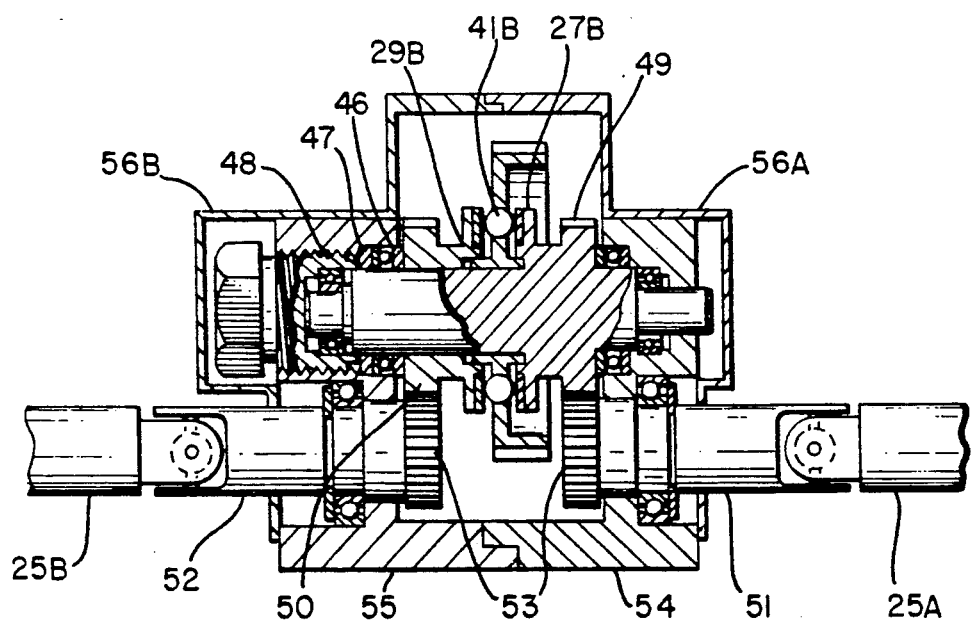
FIG. 5 is a view of a second known prior art device.

FIGS. 4 and 5 illustrate known prior art where a differential mechanism having a purpose similar to the instant invention and requires disassembly of the vehicle's drive line to adjust the tractive torque at the driven wheels, or require removal of its cover to gain access to the adjustment members.

In FIG. 4 a driven line 25A has been removed in order to allow the wrench 2B to be seated inside the head of adjusting screw 43. To accomplish the removal of drive line 25A, the flanges 44A and 44B of universal yoke 21C must be pried over opposite trunnions 45 of universal cross 24D. This is time consuming since prying tools are often screw drivers, pliers, small shafts and the like. A serious threat of breaking one or both flanges 44A or 44B is always present. A broken flange results in further disassembly of the differential to replace the damaged part, thereby increasing the time lost in a racing event, and also increasing the cost of vehicle repair. Adjustment of tractive torque is accomplished by holding the driven axle 25B, inserting the wrench 2B into the recessed socket within the adjusting screw 43. Rotating the screw 43 causing the thread engagement with adjusting nut 16A to increase or decrease, thereby causing adjusting nut 16A to change the compressive force exerted by spring 38A upon a second driving plate 29A resulting in a reduced, or increased compressive force applied to the rolling bearings 41A by driving plates 27A and 29A. Changes of compressive forces upon the rolling bearings 41A causes changes in tractive torque available at the driven wheels. After the adjustment is made, the driven shaft 21C is replaced in the reverse order from its removal, providing another opportunity for damage to the drive line universal yokes.

A conventional dropped drive line differential is shown in FIG. 5. Cowling halves 56A and 56B must be removed from trunnions 54 and 55 in order to gain access to the adjusting nut 48. Drive lines 25A and 25B must be removed before cowling halves 56A and 56B can be removed. With the cowling removed, hold the driven shaft 25A, and rotate adjusting nut 48 thereby causing the compressive force of spring 47 applied to a second driven plate 29 to change. This change of compressive force applied to the second driven plate 29B results in a change in compressive force on the rolling bearings 41B between the first driven plate 27B and a second driven plate 29B. Variation of this compressive force provides for adjustment of the tractive torque at the driven wheels.

In summary the differential's, torque adjustments applied to the driven wheels of a model vehicle are made by inserting a locking pin into its driving differential; rotating a driven wheel until the locking pin passes through a first stub axle that is connected to driven wheel, and by one of the flat parallel surfaces of a locking adjusting nut, thereby preventing rotation of the first stub axle and locking adjusting nut. The external threaded end of the second stub axle engages the internal threads of the locking adjusting nut, while the opposite end is attached to a second driven wheel and is free to rotate. The first stub axle drives a laterally sliding friction driven plate, and the second stub axle drives a laterally fixed friction driven plate. These friction driven plates oppositely bear against rolling bearings encased within the web of a primary driving gear, and the torque transmitted to the driven wheels is proportional to the compressive force applied by the friction driven plates to the rolling bearings within the web of the primary driving gear. An outer shoulder of the locking adjusting nut bears against the free end of a compression spring, while the fixed end of the compression spring bears against the outer race of a thrust bearing supported in the laterally sliding friction driven plate. Rotation of the free turning wheel (which is coupled to the second stub axle which has external threads on one end that are engaged with the internal screw threads of the adjusting nut), causes the adjusting nut to travel axially along the threaded end of the second stub axle causing the compressive force exerted by the compression spring upon the friction driven plates to change. This change in compressive force by the compression spring upon the friction driven plates results in a change in torque at the driven wheels of the model vehicle.

It is seen that a useful invention has been provided for use with scale model vehicles that are remotely controlled, and is particularly adaptable to competitive racing vehicles. The invention substantially meets it's objectives set forth herein, providing an improvement that results in economy of vehicle operation not supplied before. The invention is not limited to the described structure, but may be made in many ways within the scope of the appended claims.

The components shown in FIG. 2 may be selectively made of metal, plastic, graphite, ceramic, or other materials within the scope of good engineering practice.

What is claimed is:

1. In the power train of a model vehicle comprising a differential enclosure, a differential assembly, a primary driven gear having a configured web, within said differential assembly, friction driving members encased within said web, friction driven plates, a stored energy device, a locking adjusting nut, a first stub axle, a second stub axle, universal yokes, universal crosses with trunnions, at least two drive shafts, a first and second driven wheel; an improved apparatus comprising means for adjusting differential torque, without disassembly of the differential utilizing the following structures:
  a. a locking pin, with an insertion limiting means, for preventing said first driven wheel from rotating when said second driven wheel is rotated,
  b. guide means for directing said locking pin inside said differential enclosure,
  c. guide means for directing said locking pin into said first stub axle, thereby preventing said first stub axle from rotating,
  d. guide means on said locking adjusting nut allowing said locking pin to pass adjacent to a transverse surface provided by said guide means, thereby preventing said locking adjusting nut from rotating,
  e. guide means for directing said locking pin out of said first stub axle,
  f. a housing means on said first stub axle, symmetrical about the axial center line of said first stub axle, enclosing said locking adjusting nut,
  g. an external compressive means comprising an external shoulder on said locking adjusting nut, symmetrical about the axial center line of said first stub axle and second stub axle which bears against one end of said stored energy device to transmit driving torque to and between said driven plates.

2. Locking pin as in claim 1 whereby said locking pin is made of metal.

3. Locking pin as in claim 1 whereby said insertion limiting means comprising a shoulder projection normal to said locking pin's shank.

4. A locking pin as in claim 1 whereas said locking pin is a standard hexagon shaped socket head wrench.

5. Guide means as in claim 1 whereas said guide means is a hole in said differential enclosure.

6. Guide means in said first stub axle as in claim 1 whereas said guide means is a transverse hole through both walls of said housing.

7. Guide means in said locking adjusting nut as in claim 1 whereas said guide means is a slot through said locking adjusting nut.

8. Guide means in said locking adjusting nut as in claim 1 whereas said guide means are flat parallel surfaces transversally across said locking adjusting nut.

9. External compressive means comprising a shoulder on said locking adjusting nut as in claim 1 that is an integral form on said adjusting nut.

10. External compressive means comprising a shoulder on said locking adjusting nut as in claim 1 that is removable.

11. A stored energy device as in claim 1 whereas said stored energy device is a spring.

12. In the power train of a scale model vehicle having a differential enclosure made with a locking pin guide means, a differential assembly, a primary driven gear with a configured web, friction members encased within said web, at least one translatory friction driven plate and at least one fixed friction driven plate coupled to said friction members by a compressive force provided by a stored energy device, said stored energy device coupled to at least one translatory said friction driven plate with a stationary end and an opposite free end coupled to an external compressive means on an internally threaded locking adjusting nut, said locking adjusting nut configured with an external compressive means bearing against said free end of said stored energy device and flat parallel surfaces to guide said locking pin, a particularly configured first stub axle with a locking pin guide means, a particularly configured second stub axle with external threads engaging said internal threads of said locking adjusting nut, universal yokes, universal crosses with trunnions in said yokes, at least two drive shafts operatively connected with said yokes, first and second driven wheel operatively coupled to said drive shafts, and a locking pin; an improved method for adjusting the output torque of a friction driven differential and simultaneously adjusting the tractive torque at said driven wheels of a scale model vehicle, without disassembly of the differential enclosure, comprising the steps of
  a. providing guide means into said differential enclosure, and through said stub axle housing, providing flat parallel transverse locking surfaces on said locking adjusting nut, and providing a locking pin of a compatible size with each of said guide means and said flat parallel surfaces on said locking adjusting nut,
  b. inserting said locking pin into and through said guidance means of said differential enclosure,
  c. allowing said locking pin to rest in contact with the outside surface of said first stub axle that is attached to said first driven wheel by means of said universal yokes, said universal crosses with trunnions, and a said drive shaft,
  d. rotating a said driven wheel until said locking pin passes through said locking pin guide means in said first driven stub axle causing said first stub axle to become fixed in its position,
  e. rotating a said second driven wheel connected to said second stub axle by means of said universal yokes, said universal crosses with trunnions and a said drive shaft until said flat and parallel surfaces on said locking adjustment nut allows said locking pin to pass adjacent said flat and parallel surfaces on said locking adjustment nut causing said locking adjustment nut to become fixed in its position,
  f. rotating said second driven wheel causing said second stub axle to rotate its external threaded end in the internal threads of said locking adjustment nut, thereby causing said locking adjustment nut to travel axially along said external threaded end of said second stub axle thereby changing the compressive force applied to said free end of said stored energy device by said external compressive means comprising a shoulder on said locking adjustment nut, further causing said first and second friction drive plates to change their compressive force applied to said encased friction members in said web of said primary driven gear resulting in a change of the tractive torque at the driven wheels of a scale model vehicle.

13. An improved method, as in claim 12, whereby a second driven axle is rotated to adjust the output torque of a friction driven differential and concurrently tractive torque at the driven wheels.

14. In a scale model power driven vehicle, an improved method for adjusting the tractive torque at its driven wheels comprising the steps of:
  a. inserting a locking pin into its vehicle's differential from outside of a differential enclosure;
  b. rotating a driven wheel until said locking pin passes into and subsequently through a first stub axle attached to a first driven wheel causing said first wheel to be locked in a fixed position;
  c. rotating a second driven wheel until said locking pin passes adjacent a flat locking surface provided on a locking adjusting nut that is engaged to the external threads of a second stub axle which is coupled to a second driven wheel, thereby causing said locking adjusting nut to be locked in a fixed position;

d. continue rotating said second driven wheel causing said locking adjusting nut to traverse axially along threads on said second stub axle thereby changing the compressive force applied to a stored energy means that is coupled to said adjusting nut and oppositely positioned friction driving plates which bear against friction members within the web of a drive gear, thereby changing the output torque transmitted by said drive gear to said friction driving plates that are coupled to said driven wheels.

* * * * *